United States Patent [19]
Defenbaugh

[11] 3,741,394
[45] June 26, 1973

[54] LIQUID FILTERING APPARATUS
[76] Inventor: Loyd F. Defenbaugh, 21 E. Valerio Street No. 4, Santa Barbara, Calif. 93101
[22] Filed: July 7, 1971
[21] Appl. No.: 160,414

[52] U.S. Cl.................. 210/282, 210/424, 210/444
[51] Int. Cl........................ B01d 35/02, B01d 29/08
[58] Field of Search.................... 210/133, 135, 137, 210/321, 418, 282, 287, 424, 434, 443, 444, 135, 447

[56] References Cited
UNITED STATES PATENTS

| | | | |
|---|---|---|---|
| 3,262,570 | 7/1966 | Gailitis et al..................... | 210/282 X |
| 2,681,147 | 6/1954 | Braswell........................... | 210/418 X |
| 3,595,397 | 7/1971 | Abos................................ | 210/282 X |
| 2,707,051 | 4/1955 | Mailhot et al. ..................... | 210/137 |
| 3,670,892 | 6/1972 | Baerg et al...................... | 210/321 X |
| 3,653,514 | 4/1972 | Holler et al...................... | 210/424 X |

Primary Examiner—Frank A. Spear, Jr.
Attorney—Lyon & Lyon

[57] ABSTRACT

A liquid filtering apparatus primarily intended for the filtering of water comprising a housing which includes means for inserting the apparatus in the water line, wherein removable cartridges may be inserted containing suitable filtering means such as activated carbon particles, there being a three-way diverter valve operable to divert water flow through the filtering substance or straight through the apparatus bypassing the filtering substance. The device also includes a metering valve for controlling the back pressure within the unit in order to maximize contact between the fluid and the filtering material.

4 Claims, 2 Drawing Figures

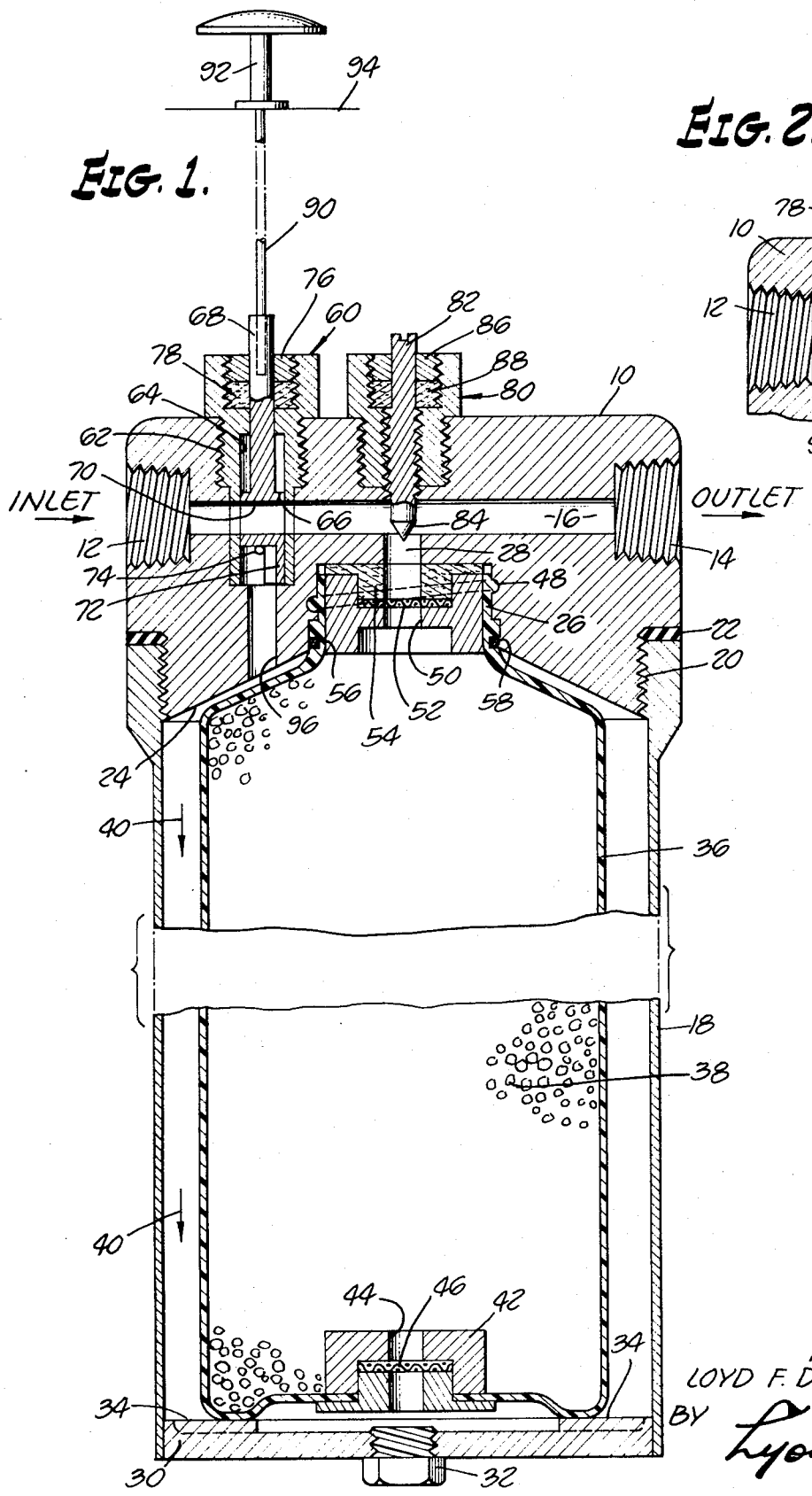
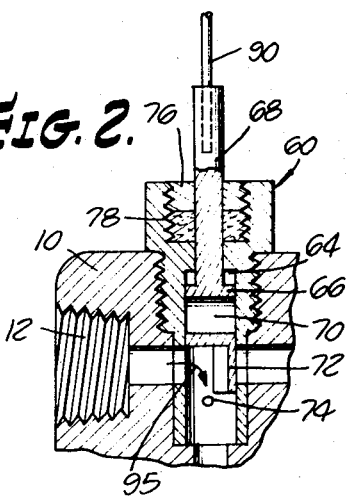

LIQUID FILTERING APPARATUS

BACKGROUND OF THE INVENTION

In many areas drinking water contains both organic and inorganic substances, the amount thereof often varying with the time of year. These substances impart an unpleasant tast and odor to the water or render it cloudy and therefore unpleasant to drink. For this reason, many people who live in areas troubled with this condition find it necessary to purchase bottled water which has already been filtered and cleaned. As an alternative, various types of filtering devices have been proposed which contemplate the diversion of the incoming water through a filtering device, usually employing a fibrous or granular filtering material and often a replaceable filter cartridge. Such devices are similar to that shown in the U.S. Pat. to M.C. Sicard No. 2,966,990 issued Jan. 3, 1961. Although any type of housing is generally acceptable for the purposes outlined, there are some serious disadvantages to the type of apparatus shown in the Sicard Patent, principally that the diverted water always runs through the filtering material and secondly that there is no means of providing back pressure within the cartridge so that maximum filtering does not take place and it is possible for loose or loosened particles of the filtering medium to find their way into the outlet. In domestic applications of the filtering apparatus, wherein the filter unit would be placed in the cold water inlet line, it is obvious that all water utilized will not need to be filtered. Accordingly, the useful lifetime of the filtering medium is needlessly shortened to a substantial degree.

SUMMARY OF THE INVENTION

It is the object of the present invention to provide an improved filtering means in which the filtering medium in replaceable cartridge form is held within a housing which is provided with a diverter valve so that, at the option of the user, the water may be diverted through the filtering medium or allowed to flow directly through the unit without effect, thereby substantially increasing the useful life of the filter cartridge without necessity for replacement.

Further objects and advantages of the inveniton will be readily apparent upon reading the ensuing detailed description in conjunction with the accompanying drawings.

BRIEF DESCRIPTION OF THE DRAWINGS

FIG. 1 is a sectional side elevation of the filter apparatus.

FIG. 2 is a partial sectional elevation of the diverter valve portion of the apparatus.

DESCRIPTION OF THE INVENTION

In FIG. 1, the device is shown to consist of an upper housing 10 having a threaded inlet port 12 and a threaded outlet port 14 communicating with one another by a passage 16. A lower housing 18 is threadably attached by means of threads 20 to the upper housing 10. An O-ring or gasket 22 is provided between the upper housing and lower housing to prevent leakage. The interior of the upper housing 10 is provided with a somewhat conically-shaped inner surface 24 and coaxial with the center of housing 10 there is an enlarged female threaded recess 26. A coaxial fluid passage 28 is provided in the center of recess 26. The bottom 30 of lower housing 18 is provided with a drain plug 32 and a plurality of radial embossments 34. Filter material 38 is contained within a semi-flexible container 36 which is preferably a plastic material filled with uniformally sized granules of activated carbon with which container 36 is substantially but not tightly filled. Container 36 rests on the radial embossments 34 which are rather thin so that fluid is allowed to pass down the inside of housing 18 between the inner wall thereof and the outer wall of container 36 as shown by the arrow 40. The bottom of container 36 is provided with a plug 42 in which there is a coaxial passageway 44 and a fine-mesh screen 46.

At the top of container 36 the outer neck is provided with threads 48 and a coaxial aperture 50 with a fine-mesh screen 52 in place. Holding the mesh 52 in place is a disc 54 of packing material. Near the lower portion of the neck of the container is an annular groove 56 in which is situated an O-ring 58.

In the upper housing 10 there is mounted a three-way diverter valve shown generally by numeral 60. Valve 60 is threaded into housing 10 by means of a threaded shank portion 62 and is provided with an interior chamber 64 in which there resides a valve element 66 having a valve stem 68. Valve element 66 is provided with a transverse valve passage 70 and a diverter element 72, the latter being situated at the extreme bottom end of valve element 66. The configuration of diverter element 72 is substantially semi-cylindrical and in order to prevent rotation of the valve element 66 with respect to the axial fluid passage 16, a cross pin 74 is secured to the lower shank of the valve and engages the edges of diverter element 72. It will be obvious from FIG. 1 that when the valve element 66 is in the downward-most position as shown, passage 70 aligns with passage 16 permitting free flow of fluid from inlet 12 to outlet 14. Diverter valve 60 further includes a packing nut 76 and a packing gland 78 to prevent leakage of fluid past the stem 68 of the valve.

A metering valve generally designated by the numeral 80 is threaded into the upper housing 10 and there is situated coaxially therein a threaded metering valve element 82, the lower extremity of which is conically shaped at 84 and extends through passage 16 and into passage 28. Metering valve 80 likewise includes a packing nut 86 and a packing gland 88.

Valve stem 68 may be connected to any suitable control cable such as that shown at 90 which is in turn connected to a selector handle 92 mounted, for example, above a sink drainboard 94 or in any other location convenient for use.

FIG. 2 shows the position of diverter valve 60 when the valve stem 68 has been pulled upwardly, thereby removing the passage 70 from alignment with passage 16 so that now fluid entering inlet 12 will encounter diverter element 72, diverting flow from passage 16 downwardly as shown by arrow 95 so that it now flows down through passage 96 whereupon it will enter the interior of the housing and will flow downwardly in the direction of the arrows 40 between the outer wall of container 36 and the inner wall of lower housing 18. The fluid will flow underneath the bottom of the container past the radial embossments 34 then up through passage 44 into the interior of the container which it will fill, then flow up through passage 28 again communicating with passage 16 and out the outlet 14. The position of the metering valve element 82 in the passageway 28 will add back pressure to flow coming out of the container 36 which will assure that container 36 is filled with fluid and that the fluid therein has had adequate time to intermix with the carbon particles 38 contained therein and permit sufficient surface contact with those particles so as to remove therefrom the maximum quantity of organic and inorganic substances.

It should be obvious that when the user desires to filter the water for drinking or cooking purposes, he merely pulls the selector valve 92 upwardly and then turns on the water waiting sufficient time to flush out the unfiltered water which may have collected in the pipes, whereupon water flowing from the tap will be clean and clear. It has been found, that for a cartridge of about four inches in diameter and eight inches in height containing activated carbon particles will handle about 10,000 gallons of water at an efficiency in excess of 90 percent. After that time, the filtering efficiency falls off rather rapidly whereupon it should be changed. The changing of the filter material involves only the removal of the drain plug 32 to alleviate pressure within the lower housing 18, whereupon it is unthreaded from the upper housing 16 and then the container 18 is unscrewed and replaced by another container containing fresh filter material. The O-rings 58 about the neck of the container 36 prevent flow of any material amounts of water past the threads. The drain plug 32 is then replaced in the lower housing and the housing may be partially filled with water and then threaded back onto the upper housing 10. If fluid were running through the filtering material continuously, it is contemplated that an average family of four persons would have to replace the filter cartridge every two or three months whereas with proper use of the diverter valve for using filtered water only for drinking and occasional cooking purposes, it is contemplated that the life of the filter cartridge can be extended to about a year or more at maximum efficiency.

While one specific embodiment of the present invention has been shown and described, it may be obvious to persons skilled in the art that changes and modifications might be made therein without departing from this invention in its broader aspects, and it is contemplated that all such reasonable changes and modifications are within the scope of this invention.

I claim:

1. A liquid filtering apparatus of the type adapted to accommodate a filter cartridge of the type having upper and lower apertures and containing a quantity of filtering material therein, the combination comprising:

an upper housing and a lower housing removably attached together, said lower housing defining a chamber adapted to receive said cartridge therein, said chamber including means defining fluid passages therein communicating with the lower aperture of the said cartridge;

said upper housing having fluid inlet and outlet ports, a first lateral passage extending through said upper housing between said inlet and outlet ports, an aperture for receiving said cartridge therein, a second fluid passage extending between said aperture and said first passage, said second passage extending normal to said first passage, a third fluid passage extending normal to said first passage and communicating said first passage with the chamber of said lower housing, said third passage intersecting said first passage intermediate said inlet port and said second passage;

diverter valve means situated in said upper housing at the intersection of said first and third passages, said valve means including a movable valve element having a depending flange at one end thereof, a transverse passage through said valve element intermediate the ends thereof, said valve element being slidably movable to a first position whereby said transverse passage is registered with said first passage and said third passage is closed, said valve element being movable to a second position whereby said third passage is openly coupled to said inlet port through a portion of said first passage and wherein said depending flange is brought into registry with said first passage shutting off direct communication to said outlet port through the remainder of said first passage.

2. A liquid filtering apparatus of the type adapted to accommodate a filter cartridge of the type having upper and lower apertures and containing a quantity of filtering material therein, the combination comprising:

an upper housing and a lower housing removably attached together, said lower housing defining a chamber adapted to receive said cartridge therein, said chamber including means defining fluid passages therein communicating with the lower aperture of the said cartridge;

said upper housing having fluid inlet and outlet ports, a first lateral passage extending through said upper housing between said inlet and outlet ports, an aperture for receiving said cartridge therein, a second fluid passage extending between said aperture and said first passage, said second passage extending normal to said first passage, a third fluid passage extending normal to said first passage and communicating said first passage with the chamber of said lower housing, said third passage intersecting said first passage intermediate said inlet port and said second passage;

diverter valve means situated in said upper housing at the intersection of said first and third passages, said valve means including a cylindrical chamber, a cylindrical valve element slidably mounted in said chamber, said element having a depending arcuate flange at the lower end thereof a transverse passage through said element intermediate the ends thereof, selector means coupled to said element for selectively positioning said element in first and second positions, in said first position said transverse passage being aligned with said first passage and closing said third passage, in said second position said arcuate flange being positioned in said first passage closing the same, said third passage being thereby openly coupled to said inlet port.

3. The apparatus set forth in claim 2 wherein said selector means includes linkage means coupled to said valve element at the upper end thereof, said selector means being at a location remote from said valve housings.

4. The apparatus set forth in claim 2 further including guide means situated in said valve chamber and engaging said valve element to prevent rotation thereof.

* * * * *